(12) United States Patent
Watanabe et al.

(10) Patent No.: US 6,899,975 B2
(45) Date of Patent: May 31, 2005

(54) BATTERY PACK

(75) Inventors: Kyouichi Watanabe, Kanagawa-ken (JP); Hideaki Horie, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 301 days.

(21) Appl. No.: 10/345,993

(22) Filed: Jan. 17, 2003

(65) Prior Publication Data

US 2003/0162091 A1 Aug. 28, 2003

(30) Foreign Application Priority Data

Feb. 27, 2002 (JP) ..................... P 2002-051854

(51) Int. Cl.$^7$ ............... H01M 6/42; H01M 6/46; H01M 2/00; H01M 2/04
(52) U.S. Cl. ............... 429/156; 429/159; 429/162; 429/163; 429/176
(58) Field of Search ............... 429/156, 176, 429/159, 162, 163, 154, 96–100

(56) References Cited

U.S. PATENT DOCUMENTS

| | | | |
|---|---|---|---|
| 3,429,747 A | 2/1969 | Deseniss et al. | 429/94 |
| 3,841,914 A | * 10/1974 | Boyle et al. | 429/153 |
| 4,060,670 A | 11/1977 | Tamminen | 429/154 |
| 4,939,047 A | 7/1990 | Nagashima | 429/66 |
| 5,250,371 A | * 10/1993 | Kleinert et al. | 429/99 |
| 5,384,212 A | 1/1995 | Heiman et al. | 429/143 |
| 5,756,229 A | 5/1998 | Pyszczek et al. | 429/94 |

FOREIGN PATENT DOCUMENTS

| | | |
|---|---|---|
| DE | 37 28 931 A1 | 3/1989 |
| EP | 1 294 032 A2 | 3/2003 |
| JP | 07-122252 | 5/1995 |
| JP | 2001-236937 | 8/2001 |
| JP | 2002-208385 A | 7/2002 |

* cited by examiner

Primary Examiner—Patrick Joseph Ryan
Assistant Examiner—Thomas H. Parsons
(74) Attorney, Agent, or Firm—McDermott Will & Emery LLP

(57) ABSTRACT

A battery pack has a unit cell packaged by a package material of a laminate type, an outer case which accommodates the unit cell therein, and a vibration isolation device which attenuates vibrations inputted to the outer case and transmitted to the unit cell by pressing one side surface of the unit cell. The vibration isolation device is disposed between the unit cell and the outer case, and includes a first press structure which presses the one side surface of the unit cell. The first press structure is constituted by connecting one surface of the outer case, the one surface facing to the one side surface of the unit cell, and a press plate abutting against the one side surface of the unit cell with an elastic member interposed therebetween.

18 Claims, 9 Drawing Sheets

AMPLITUDE

BATTERY PACK

BACKGROUND OF THE INVENTION

1. Field of the Invention

The present invention relates to a battery pack accommodating a battery packaged by a package material in a case, and more specifically, to a battery pack preventing a performance deterioration of unit cells and achieving reduction of vibrations inputted thereto from the outside.

2. Description of the Related Art

A battery pack for an assembled battery includes an assembled battery and a case for accommodating the assembled battery therein. The assembled battery is constituted by electrically connecting a plurality of unit cells to one another.

As a conventional structure of pressing an assembled battery, a structure has been known, in which an assembled battery is sandwiched between a pair of restriction plates, and the pair of restriction plates are mutually coupled with coupling rods interposed therebetween (refer to Japanese Patent Application Laid-Open No. 2001-236937). Moreover, another structure has been known, in which an assembled battery is sandwiched between a pair of pressing plates, and the pair of pressing plates are mutually coupled with spring members interposed therebetween (refer to Japanese Patent Application Laid-Open No. H7-122252 (1995)).

In the above-described conventional structures of pressing an assembled battery, the assembled battery is pressed from both sides thereof, and therefore, it is at least assured that the performance deterioration of the assembled battery can be prevented, which is caused by an increase of distances between electrodes of unit cells.

SUMMARY OF THE INVENTION

However, the conventional structures are structures incapable of exerting a vibration isolation effect of preventing vibrations of the assembled battery. Therefore, if the battery pack is used under an environment where the vibrations are inputted to the case, then the vibrations inputted to the case are undesirably transmitted to the entire assembled battery and the individual unit cells. Accordingly, there is a possibility that terminal portions and bus bars, which are connection portions among the cells, will fatigue owing to the transmitted vibrations, resulting in its resistance increase and its fatigue breakage.

It is an object of the present invention to provide a battery pack that is capable of realizing both the prevention of the performance deterioration of a battery and the vibration isolation effect thereof, which have not been able to be achieved with the conventional structures, and that is capable of preventing the fracture and the resistance increase of the terminal portions and the like owing to the vibrations.

The first aspect of the present invention provides a battery pack, comprising: a unit cell packaged by a package material of a laminate type; an outer case which accommodates the unit cell therein; and a vibration isolation device which attenuates vibrations inputted to the outer case and transmitted to the unit cell by pressing one side surface of the unit cell.

The second aspect of the present invention provides a combined battery pack, comprising: a battery pack comprising a unit cell packaged by a package material of a laminate type; an outer case which accommodates the unit cell therein; and a vibration isolation device which attenuates vibrations inputted to the outer case and transmitted to the unit cell by pressing one side surface of the unit cell, wherein the combined battery pack is formed by connecting a plurality of the battery packs to one another and electrically connecting the unit cells in the battery packs to one another.

The third aspect of the present invention provides a vehicle-mounted battery pack, comprising: a battery pack comprising a unit cell packaged by a package material of a laminate type; an outer case which accommodates the unit cell therein; and a vibration isolation device which attenuates vibrations inputted to the outer case and transmitted to the unit cell by pressing one side surface of the unit cell.

The fourth aspect of the present invention provides a battery pack, comprising: a unit cell packaged by a package material of a laminate type; an outer case which accommodates the unit cell therein; and a vibration isolating means for attenuating vibrations inputted to the outer case and transmitted to the unit cell by pressing one side surface of the unit cell.

BRIEF DESCRIPTION OF THE DRAWINGS

The invention will now be described with reference to the accompany drawings wherein.

DETAILED DESCRIPTION OF THE PREFERRED EMBODIMENT

Hereinafter, description will be made of embodiments of the present invention with reference to the drawings.

Figure 1:
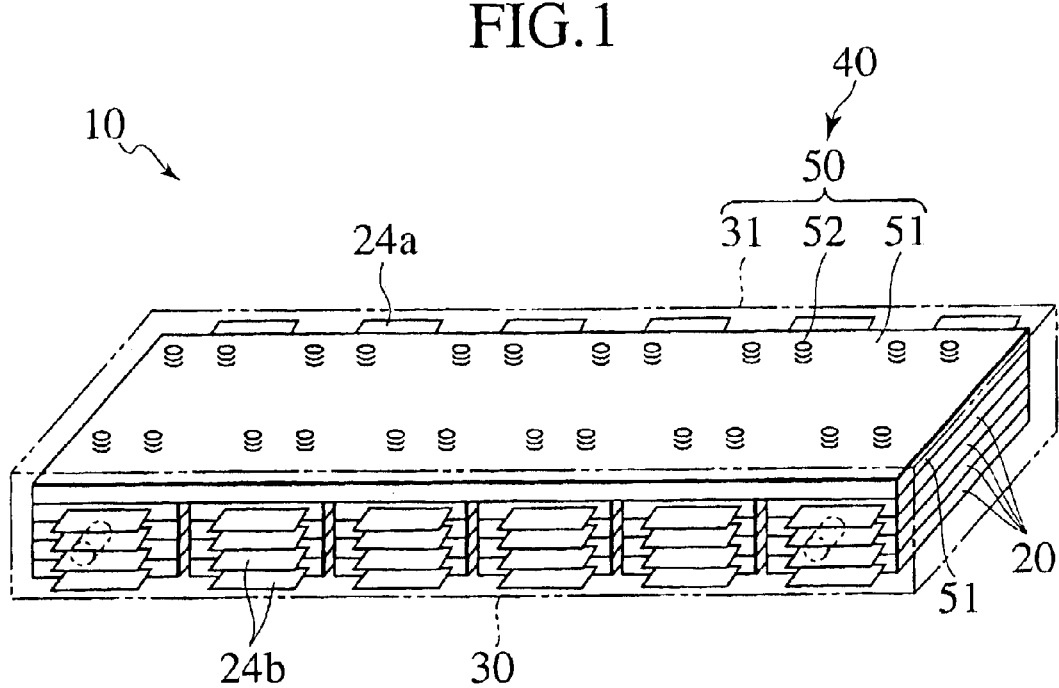
FIG. 1 is a schematic view showing an embodiment of the battery pack for an assembled battery, to which the present invention is applied.

FIG. 1 is a schematic view showing an embodiment of the battery pack 10 for an assembled battery, to which the present invention is applied.

As illustrated, the battery pack 10 according to this embodiment includes the unit cells 20, the outer case 30, and the vibration isolation device 40. The unit cells 20 are packaged by a package material of a laminate type. The outer case 30 accommodates the unit cells 20 therein. The vibration isolation device 40 presses one side surface (upper surfaces in the drawing) of the unit cells and attenuates vibrations that are inputted to the outer case 30 and transmitted to the unit cells 20. As the package material for the unit cells 20, for example, an aluminum-laminated film containing aluminum as a base material is cited. In this specification, the unit cells 20 subjected to so-called soft-pack by the package material of the laminate type are also referred to as "laminated-package unit cells 20."

The plurality of unit cells 20 in the illustrated example are accommodated in the outer case 30, thus constituting an assembled battery. This assembled battery is formed in such a manner that four pieces of unit cells 20 are stacked in the thickness direction and connected in parallel to one another, and then, six units, each being formed by connecting these four pieces in parallel, are coupled in series to one another. Note that such a connection form of the unit cells 20 is represented as "four-parallel, six-series."

The vibration isolation device 40 is disposed between the unit cells 20 and the outer case 30, and has the press structure 50 for pressing the one side surface of the unit cells 20. This press structure 50 is constituted in such a manner that one surface 31 of the outer case 30 (upper surface in the drawing) facing to the one side surface of the unit cells 20 and the press plate 51 abutting against the one side surface of the unit cells 20 are connected to each other with the elastic members 52 interposed therebetween. Usable springs as the elastic members 52 include coil-shaped springs, dish-shaped springs, plate-shaped springs, air springs and elastic springs.

Figure 2:
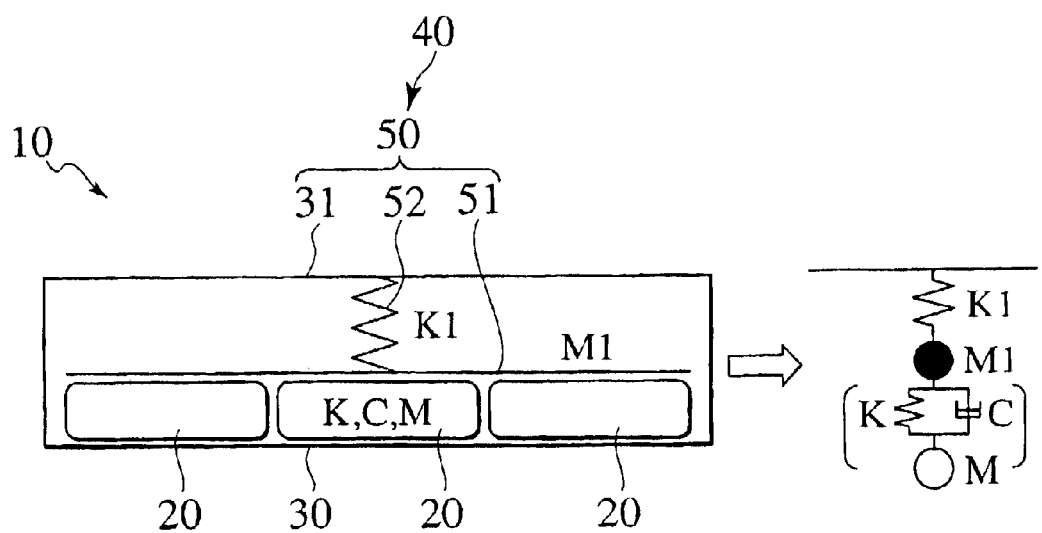
FIG. 2 is a schematic view simply showing a mass-spring model of the battery pack including the vibration isolation device.

FIG. 2 is a schematic view simply showing a mass-spring model of the battery pack 10 including the vibration isolation device 40.

When simply considering the mass-spring model as illustrated, the mass-spring model is conceived to become a multi-degree-of-freedom mass-spring model with at least two or more degrees of freedom, which is constituted by a pseudo mass-spring system of the laminated-package unit cells 20. The pseudo mass-spring system is constituted by a spring constant K1 of, for example, a press spring as the elastic member 52, a mass M1 of the press plate 51 for pressing the unit cells 20, and the unit cells 20. Here in FIG. 2, the reference symbol K denotes a spring constant of the unit cells, the symbol C denotes a damping constant thereof, and the symbol M denotes a mass of the unit cells.

The unit cells of which package is made of a metal can or a resin material cannot form a mass-spring system by themselves since the rigidity of the package material itself is high. Meanwhile, the laminated-package unit cells 20 become entirely an elastic body since they undergo the soft-pack. The inventors of the present invention paid attention to the above-described point and found out that the laminated-package unit cells 20 could form the pseudo mass-spring system by themselves. Specifically, a dynamic spring constant of the laminated-package unit cells 20 is lower than that of unit cells packaged in a can since the package material thereof is formed of a polymer film made of such as nylon, and efficiency thereof in vibration reduction is high. Thus, the laminated-package unit cells 20 can form the pseudo mass-spring system by themselves.

In this connection, it is made possible to form the mass-spring system shown in FIG. 2 by coupling the press structure 50 and the laminated-package unit cells 20.

In this case, in order to prevent vibration energy from being transmitted to the laminated-package unit cells 20 as much as possible, it is necessary to prevent resonance of the battery pack 10. However, it is actually impossible to completely eliminate the resonance. Therefore, a resonance frequency is shifted from a frequency range that can be realized under an environment where the battery pack 10 is used, resulting in a great improvement of the vibration isolation effect.

Hence, it is necessary to press the one side surface of the unit cells 20 by the elastic members 52 in order to form the multi-degree-of-freedom mass-spring system. Furthermore, vibration energy is converted into heat energy by damping of the elastic members 52 due to the existence thereof, thus making it possible to reduce the vibration energy efficiently.

Note that a vibration isolation frequency required for the battery pack 10 for an assembled battery is in a range from 10 Hz to 100 Hz. If the frequency in a range lower than 10 Hz, a possibility that the resonance frequency exists is low in terms of the size of the battery pack 10 for an assembled battery. On the other hand, a frequency of 1 kHz or higher enters a range of sound, and therefore, a necessity of the vibration isolation will be lowered.

FIGS. 3A to 4B are schematic views showing the press structures 50 of the vibration isolation devices 40.

Each of the illustrated battery packs 10 accommodates therein an assembled battery formed by connecting four pieces of the unit cells 20 in parallel through the bus bar 21. Moreover, as described above, the press structure 50 is formed by connecting the one surface 31 of the outer case 30 and the press plate 51 with the elastic members 52 interposed therebetween. Note that the form in which the four pieces of unit cells 20 are connected in parallel is represented as "four-parallel."

Figure 3A:
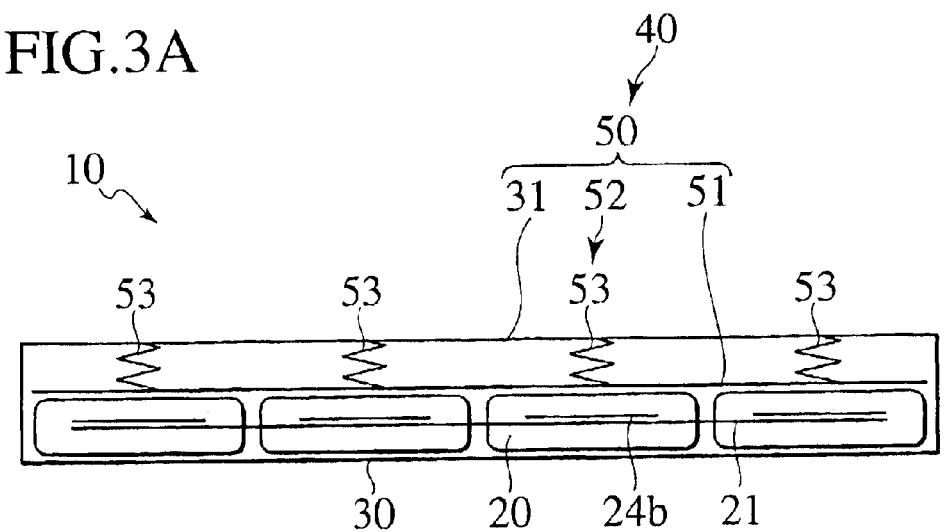
FIGS. 3A, 3B and 3C are schematic views showing the press structures of the vibration isolation devices.
Figure 3B:
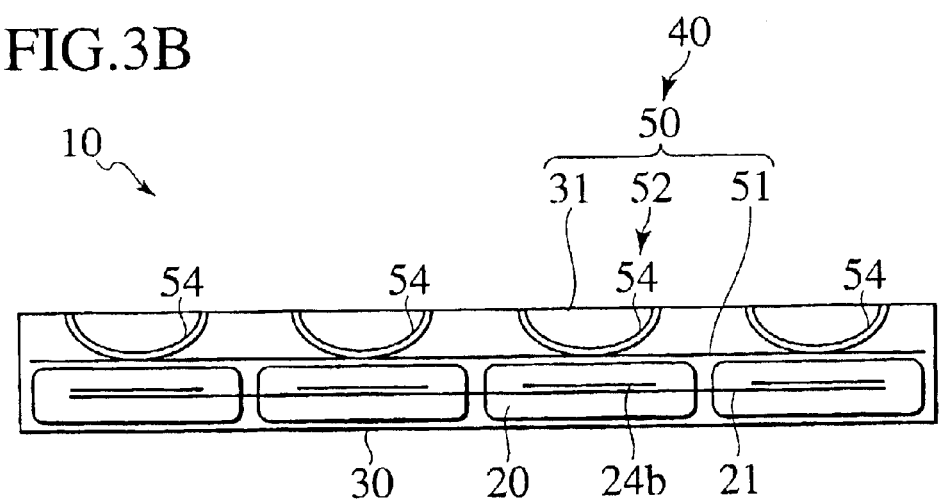
Figure 3C:
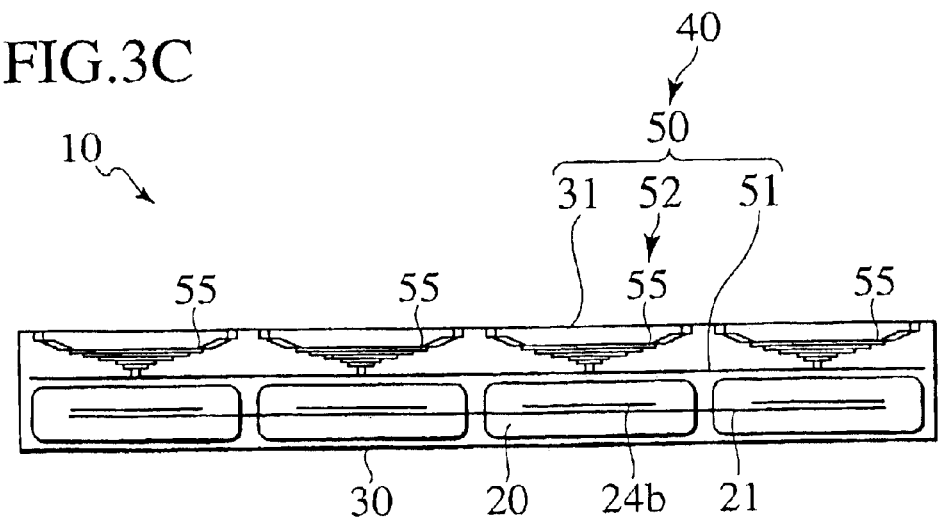
Figure 4A:
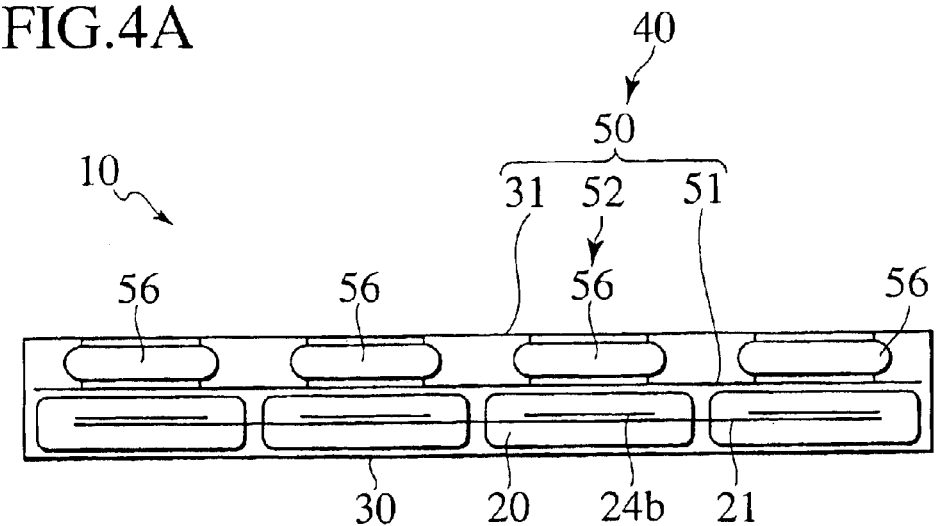
FIGS. 4A and 4B are schematic views showing the press structures of the vibration isolation devices.
Figure 4B:
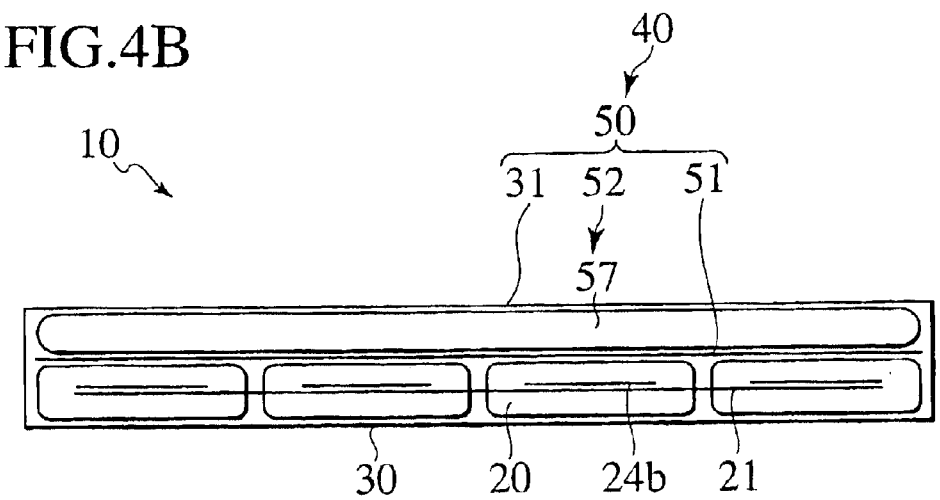

The elastic members 52 are constituted by the coil springs 53 as shown in FIG. 3A (corresponding to the coil-shaped springs), the disk springs 54 as shown in FIG. 3B (corresponding to the dish-shaped springs), the laminated leaf springs 55 as shown in FIG. 3C (corresponding to the plate-shaped springs), the air springs 56 as shown in FIG. 4A, or the elastic spring 57 as shown in FIG. 4B.

Here, each air spring 56 is one made to be an elastic member by enclosing gas in a thin-film bag constituted by, for example, rubber and a fiber. The air spring 56 uses the pressure of the gas as elastic force by enclosing the gas in a certain space. As a type of the gas for using, one that is easily available and simple in handling, such as air, nitrogen and oxygen, is suitable.

Moreover, the elastic spring 57 is one obtained by forming general rubber, elastomer or resin into a block shape, and the elastic material described in JIS K6386 (Rubber materials for vibration isolator) (ISO) will be able to attain the object of the present invention.

In the case of using the coil springs 53 (refer to FIG. 3A) for the elastic members 52 of the press structure 50, when vibrations are inputted thereto, vibration energy thereof is converted into energy, which is accompanied with deformation of metal or other materials forming the coil springs 53, and heat energy. Thus, the vibrations transmitted to the unit cells 20 are attenuated.

In the case of using the disk springs 54 (refer to FIG. 3B) for the elastic members 52, when vibrations are inputted thereto, vibration energy thereof is converted into energy, which is accompanied with the flexure of the dishes, and heat energy, and thus the vibrations transmitted to the unit cells 20 are attenuated.

In the case of using the laminated leaf springs 55 (refer to FIG. 3C) for the elastic members 52, when vibrations are inputted thereto, the laminated leaves are shifted thereamong, energy of the vibrations is converted into heat energy by friction among the leaves, and thus the vibrations transmitted to the unit cells 20 are attenuated.

In the case of using the air springs 56 (refer to FIG. 4A) and the elastic spring 57 (refer to FIG. 4B) for the elastic members 52, when vibrations are inputted thereto, vibration energy thereof is converted into energy, which is accompanied with deformation of metal or other materials forming these springs, and heat energy. Thus, the vibrations transmitted to the unit cells 20 are attenuated.

Figure 5:
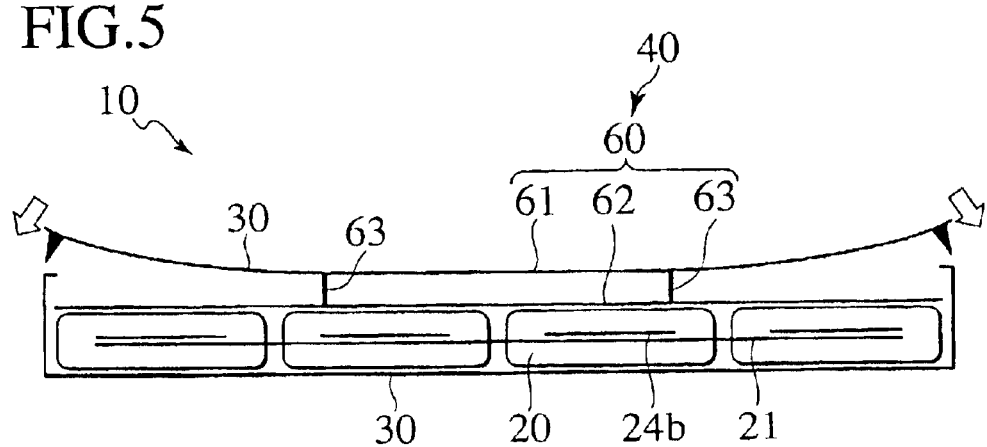
FIG. 5 is a schematic view showing a modification example of the press structure of the vibration isolation device.

FIG. 5 is a schematic view showing a modification example of the press structure of the vibration isolation device 40.

The vibration isolation device 40 includes the press structure 60 for pressing the one side surface of the unit cells 20 by surface rigidity of a plate material forming the one surface 31 of the outer case 30. This press structure 60 is constituted by connecting the plane elastic member 61 and the press plate 62 with the support members 63 interposed therebetween, in which the plane elastic member 61 (corresponding to an elastic plate material) forms the one surface 31 of the outer case 30 facing to the one side surface of the unit cells 20, and the press plate 62 abuts against the one side surface of the unit cells 20. The shape of the press plate 62 is not particularly limited as long as the press plate 62 can press the unit cells 20. However, the shape should be that of a plane plate coincident with the shape of the outer case 30 in terms of evenly pressing the unit cells 20.

The press structure 60 in the form described above will be able to press the unit cells 20 by utilizing at least one surface of the outer case 30 as a plane-shaped spring. Moreover, it is not necessary to use the elastic members 52 such as springs for the connection between the outer case 30 and the press plate 62, and therefore, an advantage that the structure can be simplified is inherent therein.

Figure 6A:
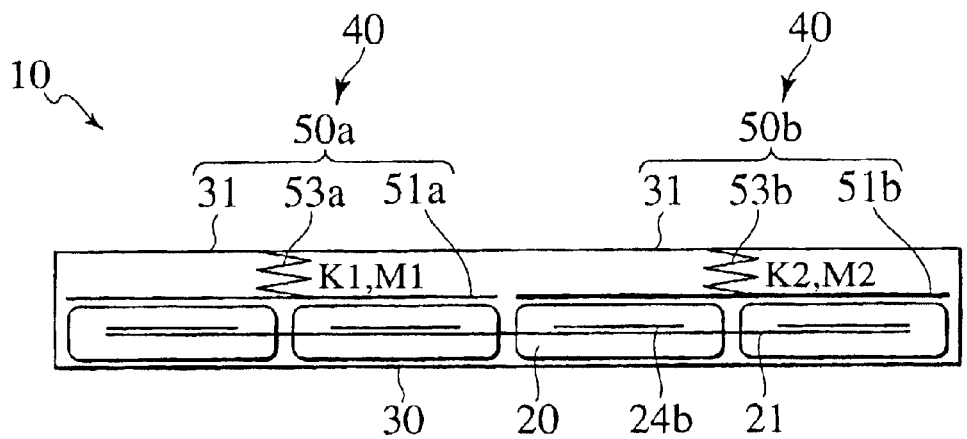
FIGS. 6A and 6B are schematic views showing embodiments of the battery pack including the plurality of vibration isolation devices.
Figure 6B:
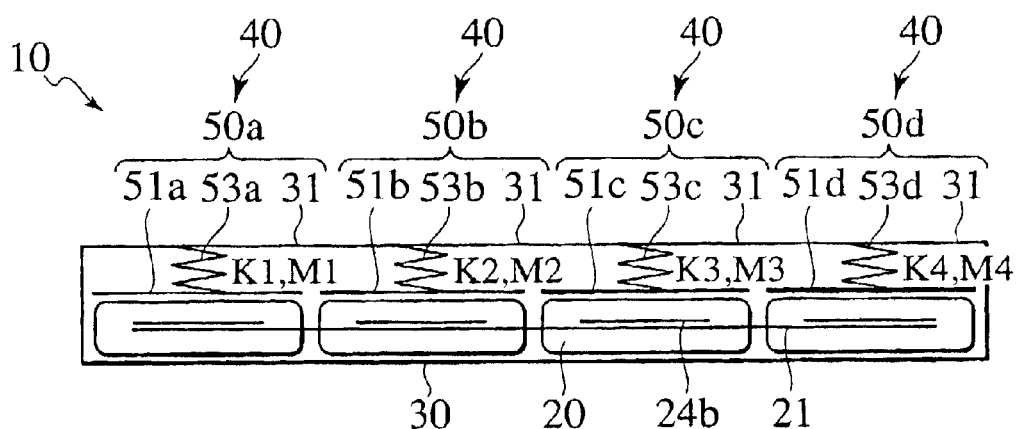

FIGS. 6A and 6B are schematic views showing embodiments of the battery pack 10 including the plurality of vibration isolation devices 40.

The number of the vibration isolation device 40 is not limited to one. As shown in FIGS. 6A and 6B, the plurality of vibration isolation devices 40 may be provided in one battery pack 10. Specifically, the unit cells 20 in one battery pack 10 may be pressed by at least two or more individual vibration isolation devices 40 independently, and thus the unit cells 20 may be pressed by at least two or more of pressing force. Moreover, two or more press plates 51 may be provided. The vibration isolation devices 40 in the form thus described are effective as devices for preventing the performance deterioration of the unit cells 20 and reducing the vibrations inputted thereto from the outside.

The battery pack 10 shown in FIG. 6A accommodates therein four-parallel assembled battery. Two unit cells 20 on the left side are pressed by the press structure 50a formed by connecting the one surface 31 of the outer case 30 and the press plate 51a (mass: M1) with the coil spring 53a (constant of press spring: K1) as the elastic member 52 interposed therebetween. Two unit cells 20 on the right side are pressed by the press structure 50b formed by connecting the one surface 31 of the outer case 30 and the press plate 51b (mass: M2) with the coil spring 53b (constant of press spring: K2) interposed therebetween. In the form thus described, a degree of freedom is higher than that of one mass-spring system for the conventional resonance frequency in the assembled battery due to an effect of a tuned mass damper, which is brought by two new mass-spring systems (50a and 50b). Therefore, shift of the entire frequencies is made possible.

In order to further increase the degree of freedom for the frequency shift, it is effective to set mass-spring systems with the number equal to the number of unit cells 20. Specifically, the battery pack 10 shown in FIG. 6B accommodates therein the four-parallel assembled battery pressed by the following structures. The unit cell 20 on the first left side is pressed by the press structure 50a formed by connecting the one surface 31 of the outer case 30 and the press plate 51a (mass: M1) with the coil spring 53a (constant of press spring: K1) interposed therebetween. The unit cell 20 on the second left side is pressed by the press structure 50b formed by connecting the one surface 31 of the outer case 30 and the press plate 51b (mass: M2) with the coil spring 53b (constant of press spring: K2) interposed therebetween. The unit cell 20 on the third left side is pressed by the press structure 50c formed by connecting the one surface 31 of the outer case 30 and the press plate 51c (mass: M3) with the coil spring 53c (constant of press spring: K3) interposed therebetween. Then, the unit cell 20 on the first right side is pressed by the press structure 50d formed by connecting the one surface 31 of the outer case 30 and the press plate 51d (mass: M4) with the coil spring 53d (constant of press spring: K4) interposed therebetween. In the form thus described, four mass-spring systems (50a, 50b, 50c and 50d) are set for the four-parallel assembled battery, thus making it possible to carry out frequency shift with a higher degree of freedom.

Figure 7:
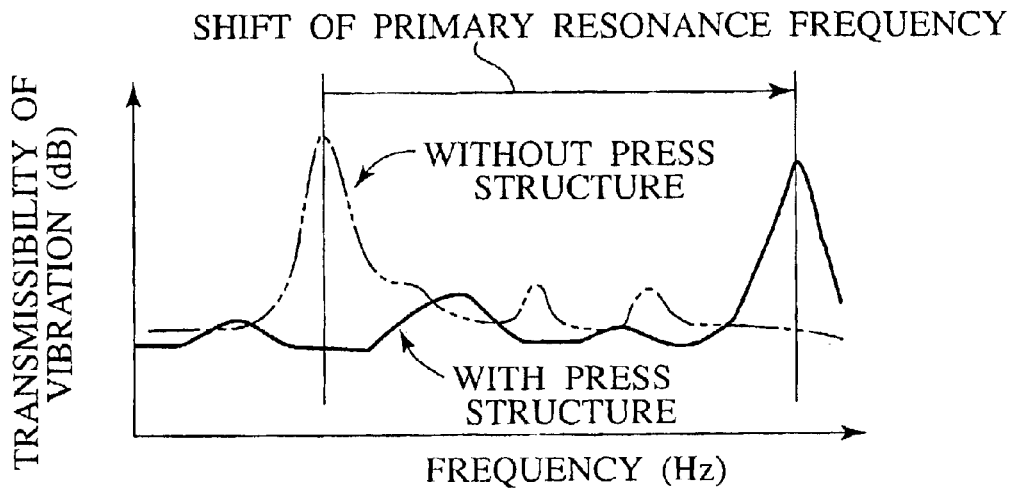
FIG. 7 is a conceptual diagram showing resonance spectra obtained by hammering tests performed for the battery packs.

FIG. 7 is a conceptual diagram showing resonance spectra obtained by hammering tests performed for the battery packs 10. The resonance spectrum of the battery pack 10 shown in FIG. 6B is shown by a solid line, and the resonance spectrum of the battery pack 10 that is not provided with the press structure 50 is shown by a two-dotted chain line.

While the hammering tests will be described later, a peak appearing on the lowest frequency side in the obtained resonance spectrum is defined as a primary resonance frequency. As apparent from FIG. 7, the primary resonance frequency could be shifted to the higher frequency side by providing the vibration isolation devices 40 including the press structures 50, and it was confirmed that the frequency shift with a higher degree of freedom could be carried out. Also in the case of providing the vibration isolation device 40 including the press structure 60 shown in FIG. 5, it was confirmed similarly that the primary resonance frequency could be shifted to the higher frequency side and that the frequency shift with a higher degree of freedom could be carried out.

When an external region on which the battery pack 10 is installed has a certain resonance frequency, the resonance frequency of the battery pack 10 is set at a reverse phase to that of the external region, thus making it possible to shift the resonance of the entire battery pack 10 accommodating the assembled battery therein.

FIGS. 8A and 8B and FIGS. 9A and 9B are top plan views and side views schematically showing embodiments of the battery pack 10 including the vibration isolation devices 40 on the resonance peak positions A on the one surface 31 of the outer case 30.

Figure 8A:
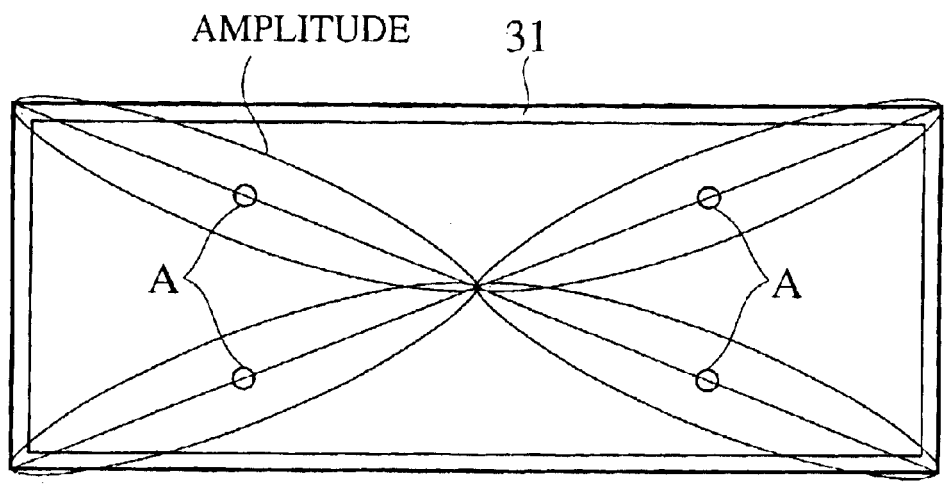
FIG. 8A is a top plan view schematically showing embodiment of the battery pack including the vibration isolation device on the resonance peak positions on the one surface of the outer case.
Figure 8B:
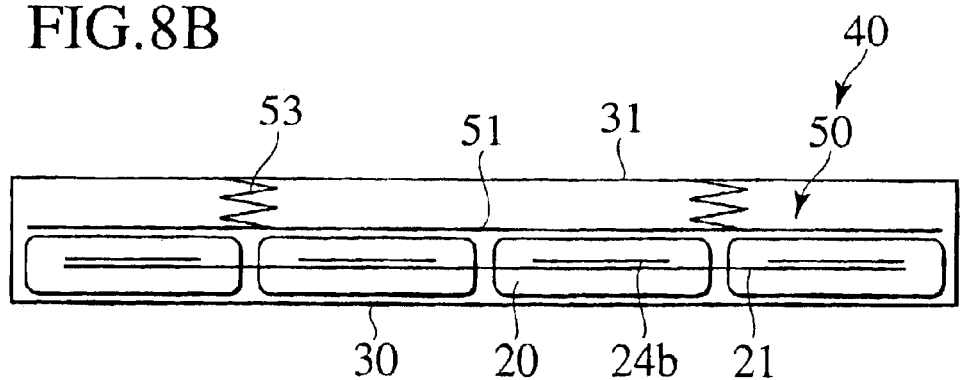
FIG. 8B is a side plan view schematically showing embodiment of the battery pack including the vibration isolation device on the resonance peak positions on the one surface of the outer case.

The battery pack 10 shown in FIGS. 8A and 8B accommodates therein the four-parallel assembled battery. Four pieces of the unit cells 20 are pressed by the press structure 50 formed by connecting the one surface 31 of the outer case 30 and the press plate 51 with two coil springs 53 as the elastic members 52 interposed therebetween. The vibration isolation device 40 including the press structure 50 is provided on at least one or more resonance peak positions A on the one surface 31 of the outer case 30, which faces to the one side surface of the unit cells 20.

Figure 9A:
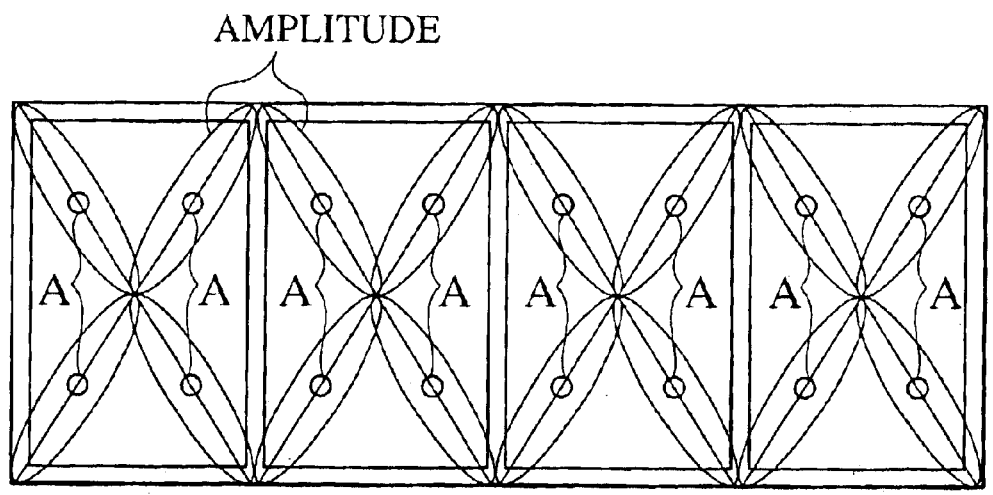
FIG. 9A is a top plan view schematically showing embodiment of the battery pack including the vibration isolation device on the resonance peak positions on the one surface of the outer case.
Figure 9B:
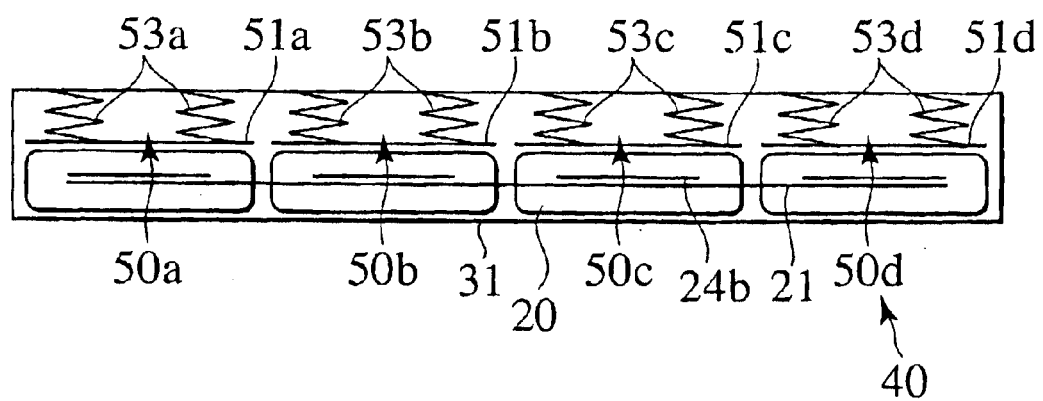
FIG. 9B is a side plan view schematically showing embodiment of the battery pack including the vibration isolation device on the resonance peak positions on the one surface of the outer case.

The battery pack 10 shown in FIGS. 9A and 9B accommodates therein the four-parallel assembled battery. Four pieces of the unit cells 20 are independently pressed, respectively, by four pieces of the press structures 50a to 50d formed by connecting the one surface 31 of the outer case 30 and the press plates 51a to 51d with the coil springs 53a to 53d, each spring unit having two springs, as the elastic members 52 interposed therebetween. Each of the vibration isolation devices 40 including the press structures 50a to 50d is also provided on at least one or more resonance peak positions A on the one surface 31 of the outer case 30, which faces to the one side surface of the unit cells 20.

The reason that the vibration isolation device 40 is provided on the resonance peak positions A on the one surface 31 of the outer case 30 is as follows. The entire resonances of the assembled battery and the battery pack 10 are brought about by which the resonance peak positions A of the outer case 30 vibrate. That is because it is made therefore possible to reduce the original resonance by setting, in the regions corresponding to the peak positions, so-called pins in the press structure 50 to suppress the vibrations.

With regard to the lower frequency side where the resonance poses the most troublesome problem, the resonances of the outer case 30 occur on one-quarter and three-quarter positions on the diagonals of the outer case 30. Therefore, the entire resonances through the assembled battery and the battery pack 10 can be effectively restricted by arranging the vibration isolation devices 40 in coincidence with the above-described positions.

Note that, when the battery pack 10 is installed in another external structure, it may sometimes be effective to use the resonances of the battery pack 10 for the purpose of isolating the resonances of the external structure. For such a purpose, the positions where the vibration isolation devices 40 are arranged are not limited to the above-described resonance peak positions A of the outer case 30, and may satisfactorily be set at positions meeting the object of isolating the resonances of the external structure.

Desirably, the pressing force, that is, a stress per unit area, with which the vibration isolation device 40 presses the one-surface side of the unit cells 20, is ten times the Young's modulus of the unit cells 20 or less. The reason is as follows.

With the constitution of the battery pack 10 of this embodiment, the effect of preventing a performance deterioration and the effect of attenuating vibrations can be basically obtained irrespective of the magnitude of pressing force. However, in order to effectively shift the resonance frequency of the conventional assembled battery, the spring constant of the press spring and the spring constant of the spring characteristics inherent in the unit cells 20 are preferably as close as possible to each other. The spring constants of both of the above are made close to each other, whereby the press spring and the unit cells 20 function as springs individually to effectively shift the frequency, thus making it possible to reduce the vibration transmission.

In order to exert the above-described effect, it is preferable that the pressing force per unit area be ten times the Young's modulus of the pressed unit cells 20 or less. If the pressing force is more than ten times the Young's modulus of the unit cells 20, then it will be difficult to shift the resonance frequency. Moreover, the rigidity of the package is relatively low in the laminated package unit cells 20, and therefore, an occurrence probability of an internal short circuit may be increased if the unit cells 20 are pressed with too large pressing force, and there is a possibility that another object of preventing the performance lowering cannot be attained. This is the reason for the above-described difficulty.

From these viewpoints, pressing force equal to or more than 0.1 kgf/cm$^2$ is necessary in order to effectively exert the effect of preventing the performance lowering of the unit cells 20, and it is necessary to set the pressing force at 10 kgf/cm$^2$ or less in order to prevent a micro short circuit of the unit cells 20. Accordingly, the pressing force for pressing the one side surface of the unit cells 20 is preferably set in a range from (0.1 kgf/cm$^2$ to 10 kgf/cm$^2$.

It is desirable that a pressed area of the one side surface of the unit cells 20, which is pressed by the vibration isolation device 40, be set in a range from 50% to 100% of an area onto which the electrode surfaces of the unit cells 20 are projected. Here, the area onto which the electrode surfaces of the unit cells 20 are projected (hereinafter, also referred to as an "electrode projection area") means only an area onto which the electrode surfaces are projected, and does not include an area of a seal portion and an area of tab portions in the unit cells 20. The reason that the pressed area is defined as described above is as follows.

If the pressed area is smaller than 50% of the electrode projection area, then the mass-spring of the unit cells 20 is used only partially when constituting the mass-spring system. Therefore, there is a possibility that the frequency cannot be shifted effectively. Moreover, it is effective to press evenly the entire region onto which the electrode surfaces are projected in order to prevent the performance deterioration accompanied with gas production within the unit cells 20. If the pressed area is smaller than 50% of the electrode projection area, then there is a possibility that an unpressed region in the region onto which the electrode surfaces are projected will be deteriorated, thus causing a possibility of being incapable of exerting even performance with the entire unit cells 20.

Figure 10A:
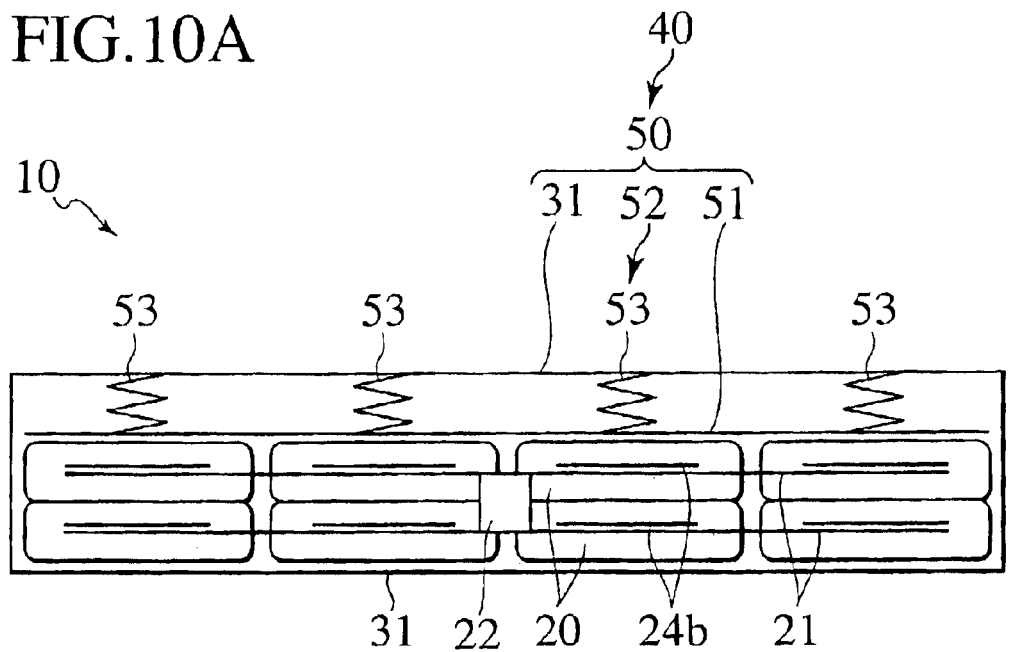
FIGS. 10A and 10B are schematic views of embodiments of the battery packs for assembled batteries, which are constituted by stacking the unit cells in the thickness direction.
Figure 10B:
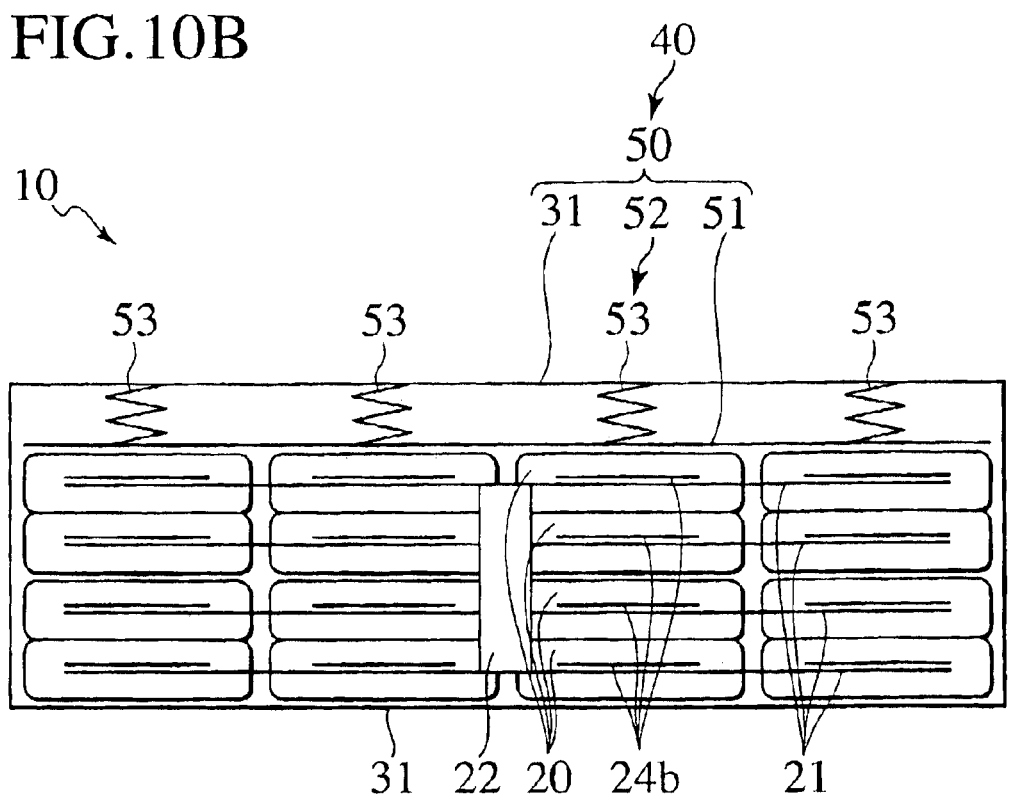

FIGS. 10A and 10B are schematic views of embodiments of the battery packs 10 for assembled batteries, which are constituted by stacking the unit cells 20 in the thickness direction.

The battery pack 10 shown in FIG. 10A accommodates therein an assembled battery in which eight pieces of the unit cells 20 stacked in two steps in the thickness direction are connected in parallel through the bus bars 21 and 22. The eight pieces of the unit cells 20 stacked in two steps, four pieces being in each step, is pressed by the press structure 50 formed by connecting the one surface 31 of the outer case 30 and the press plate 51 with four coil springs 53 as the elastic members 52 interposed therebetween. The battery pack 10 shown in FIG. 10B accommodates therein an assembled battery in which sixteen pieces of the unit cells 20 stacked in four steps in the thickness direction are connected in parallel through the bus bars 21 and 22. The sixteen pieces of the unit cells 20 stacked in four steps, four pieces being in each step, is pressed by the press structure 50 formed by connecting the one surface 31 of the outer case 30 and the press plate 51 with four coil springs 53 as the elastic members 52 interposed therebetween. Note that a form where eight pieces of the unit cells 20 are connected in parallel is represented as "eight-parallel", and a form where sixteen pieces of the unit cells 20 are connected in parallel is represented as "sixteen-parallel".

Also in the battery pack 10 that accommodates therein the assembled battery in which the unit cells are stacked in the thickness direction, the effect of preventing the performance deterioration and the effect of attenuating the vibrations can be obtained by setting the pressing force based on a similar approach to the above-described approach. Specifically, it is effective to press the unit cells 20 with pressing force of ten times or less the Young's modulus in the case of stacking the unit cells 20 in the serial direction to the pressing mass-spring system.

Note that the effect of preventing the performance deterioration and the effect of attenuating the vibrations can be obtained also by interposing an intermediate plate such as a metal plate in the intermediate position of the stacked unit cells 20.

Figure 11A:
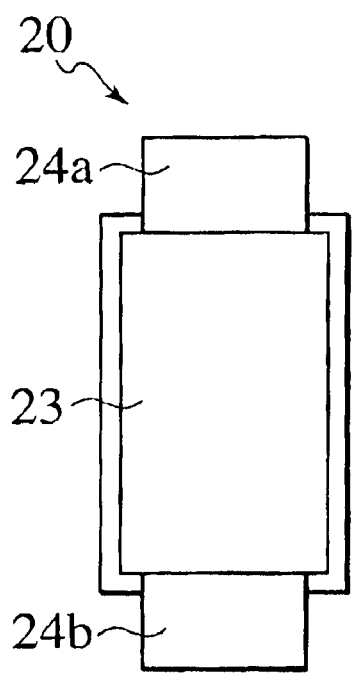
FIG. 11A is a plan view showing the laminated package unit cell for using in the battery pack of the present invention.
Figure 11B:
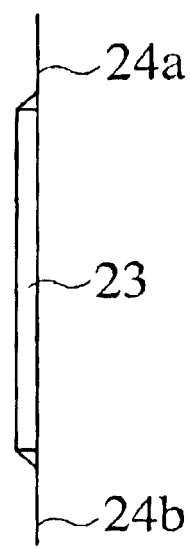
FIG. 11B is a side view showing the laminated package unit cell for using in the battery pack of the present invention.
Figure 11C:
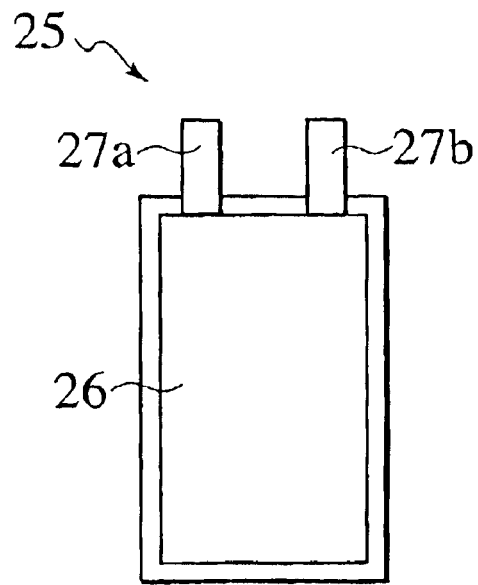
FIG. 11C is a plan view showing the general laminated package unit cell.
Figure 11D:
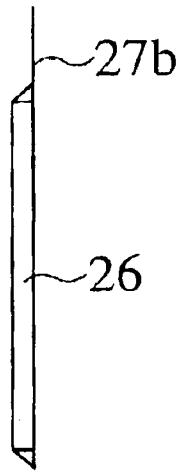
FIG. 11D is a side view showing the general laminated package unit cell.

FIGS. 11A and 11B are plan and side views showing the laminated package unit cell 20 for using in the battery pack 10 of the present invention, and FIGS. 11C and 11D are plan and side views showing the general laminated package unit cell 25.

The general laminated package unit cell 25 has both of the positive tab terminal 27a and the negative tab terminal 27b provided on one end portion (upside in the drawing) of the cell body 26 as shown in FIGS. 11C and 11D. When the unit cell 25 is accommodated in the battery pack 10, the respective tab terminals 27a and 27b must be coupled to lead wires and the like. Therefore, in the laminated package unit cell 25 provided with the positive and negative tab terminals 27a and 27b on the one end portion of the cell body 26, the connection spring constants of the tab terminals 27a and 27b are increased, and in the inside of the battery pack 10, the one end portion (upper end in the drawing) of the cell body 26 becomes a fixed end, and the other end portion (lower end in the drawing) of the cell body 26 becomes a free end. When vibrations are inputted to the unit cell 25 thus formed, the swing of the free end where the tab terminals 27a and 27b are not provided is increased, and metal fatigue is apt to occur in the tab terminals 27a and 27b. With this structure, there is a possibility that the object of preventing the performance deterioration in the present invention cannot be attained sufficiently.

In this connection, as shown in FIGS. 11A and 11B, it is preferable that the laminated package unit cell 20 for using in the battery pack 10 according to the present invention be a unit cell 20 including the tab terminals 24a and 24b on the both end portions of the cell body 23. If the unit cell 20 has the tab terminals 24a and 24b individually on the both end portions of the cell body 23, then the both end portions (upper and lower ends in the drawing) of the cell body 23 become fixed ends when the unit cell 20 is accommodated in the outer case 30. According to the unit cell 20 thus formed, the vibrations are inputted evenly to the unit cell 20 without increasing a swing on one tab terminal side even when vibrations are inputted thereto. Consequently, the metal fatigue will be difficult to occur in the tab terminals 24a and 24b. Thus, the intended object of preventing the performance deterioration in the present invention can be attained sufficiently.

It is preferable that the laminated package unit cell 20 for using in the battery pack 10 of the present invention be a thin unit cell 20 having a thickness ranging from 1 to 10 mm in the direction where the electrodes are stacked. The reason is as follows.

Specifically, the spring constant of the unit cell 20 is determined by a Young's modulus thereof ($N/m^2$), and when the thickness of the unit cell 20 is too large, the spring constant is reduced too much, making it difficult to press the unit cell 20. This is the reason for the above. Moreover, if the spring constant of the unit cell 20 is too small, then the spring constant of the unit cell 20 will be dominant to the entire spring constant when large pressing force is applied to the unit cell 20. Thus, it will be difficult to shift the frequency from a viewpoint of the balance of the resonance frequencies. This is another reason. Meanwhile, it is conceived to press the unit cell 20 with the force of the spring constant as small as that of the unit cell 20 while putting priority on the balance of the spring constants. However, in this case, the pressing force will be insufficient, and therefore, the distance between the electrodes will be increased owing to minute gas production within the unit cells 20, and the effect of preventing the performance deterioration accompanied with the increase of the distance between the electrodes will be undesirably reduced.

Furthermore, if the thickness of the unit cell 20 in the direction where the electrodes are stacked is thicker than 10 mm, then the inside of the unit cell 20 will be apt to be filled with heat, and a possibility that a thermal deterioration is increased will be raised. On the other hand, if the thickness is thinner than 1 mm, then the spring constant of the unit cell 20 will be extremely increased, causing a large problem about the balance with the pressing force and the like. Furthermore, with the unit cell 20 having a thickness thinner than 1 mm, a battery capacity cannot be secured even if the positive and negative layers are thinned, and therefore, resulting in a unit cell 20 that is less efficient economically.

It is preferable that the laminated package unit cell 20 for using in the battery pack 10 of the present invention be a thin unit cell 20, in which the width of the tab terminals 24a and 24b provided on the cell body 23 is in a range from 20% to 80% of the width of the cell body 23. The reason for this is as follows.

Specifically, with regard to the tab terminals 24a and 24b through which external vibrations are inputted to the unit cell 20, it can be said that one with the maximum area has large resistance to the vibrations. However, there is a possibility that, with regard to a laminate film serving as the package material, welded portions of the laminate film in the vicinities of the tab terminals 24a and 24b will be weak structurally. Therefore, if the width of the tab terminals 24a and 24b is larger than 80% of the width of the cell body 23, then a possibility that the welded portions of the laminate film in the vicinities of the tab terminals 24a and 24b exfoliate will be increased. Moreover, if the width of the tab terminals 24a and 24b is smaller than 20% of the width of the cell body 23, then the tab terminals 24a and 24b will be thinned so much that the resistance to the vibrations will be lowered. Thus, a possibility will be increased that the tab terminals 24a and 24b will be disconnected due to the vibrations and the deterioration.

Figure 12:
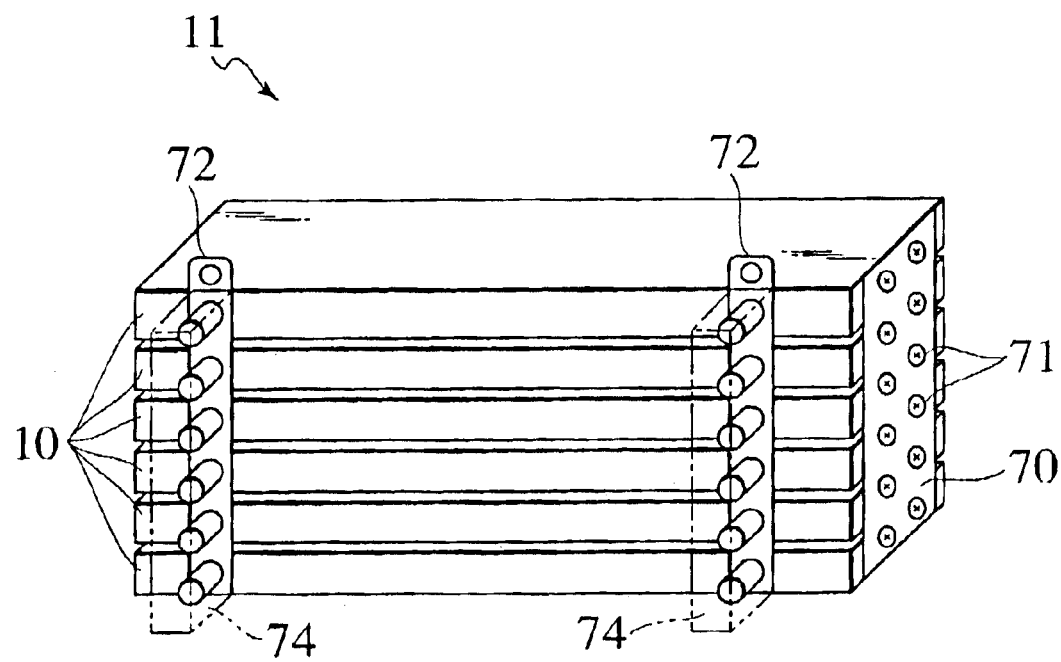
FIG. 12 is a perspective view showing an embodiment in which six pieces of the battery packs shown in FIG. 1 are connected in parallel to one another to form the combined battery pack.

FIG. 12 is a perspective view showing an embodiment in which six pieces of the battery packs 10 shown in FIG. 1 are connected in parallel to one another to form the combined battery pack 11.

The battery pack 10 according to the present invention is not limited to the use in single. The connection of two or more battery packs 10 as shown in FIG. 12 will enable an electric capacity and a voltage, which meet the usage purpose, to be formed by combining the assembled batteries accommodated in the respective battery packs 10. The combined battery pack 11 including composite assembled batteries can be formed by connecting these assembled batteries in series and in parallel.

It is certainly possible to form a desired electric capacity and the like by increasing the number of the unit cells 20. However, if the number of connected unit cells 20 is extremely increased, then a possibility will be increased that a deterioration of one unit cell 20 will lead to the deterioration of the entire assembled battery. Besides, the increased number of unit cells 20 will cause a mass increase, and thus it will be difficult to achieve the reduction of the vibrations. Hence, desirably, one battery pack 10 is constituted beforehand by forming an assembled battery from an adequate number of the unit cells 20, the plurality of battery packs 10 are electrically connected to one another, and thus a final and desired composite assembled battery is formed by coupling the individual assembled batteries to one another.

FIG. 12 shows the combined battery pack 11 in a state where six pieces of the battery packs 10 shown in FIG. 1 are coupled to one another in the vertical direction by means of the coupling plates 70 and the fixing screws 71. The terminals of the respective battery packs 10 are electrically connected to one another through the terminal plates 72, and the other region than the upper ends of the terminal plates 72 in the drawing is surrounded by the insulating cover 74 so that the upper ends can be external terminals. In this form, the composite assembled battery is formed, in which six pieces of the assembled batteries in the battery packs 10 shown in FIG. 1 are connected in parallel.

Figure 13:
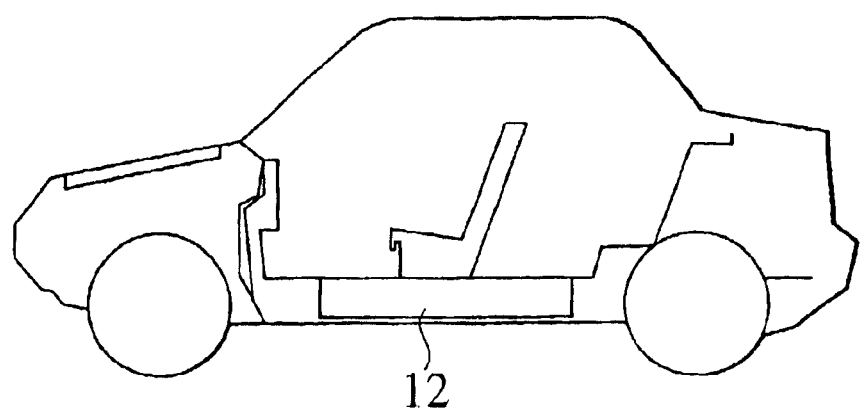
FIG. 13 is a schematic view showing an embodiment in which a single battery pack or the combined battery pack is applied to the vehicle-mounted battery pack mounted on a vehicle.

FIG. 13 is a schematic view showing an embodiment in which a single battery pack 10 or the combined battery pack 11 is applied to the vehicle-mounted battery pack 12 mounted on a vehicle.

In the case of mounting the vehicle-mounted battery pack 12 on an automobile, it is very effective to apply the present invention in order to deviate the resonance frequency of the vehicle-mounted battery pack 12 from a range of a vibration frequency occurring in the automobile. Although it is impossible to eliminate the resonance frequency in the multi-degree-of-freedom mass-spring system, the application of the present invention will enable the resonance frequency of the vehicle-mounted battery pack 12 to be deviated from the range of frequencies that can occur in the automobile. Thus, the vehicle-mounted battery pack 12 has an effect that it does not reach the resonance frequency as long as it is used in the automobile.

Note that, though the battery pack 10 in which the assembled battery is constituted by accommodating the plurality of unit cells 20 therein has been described above, the present invention is not limited to the battery pack 10 for an assembled battery. For example, the present invention can be applied also to a battery pack accommodating only one unit cell 20 in the outer case 30. Specifically, the present invention can also be applied effectively to the case where one unit cell 20 is desired to be protected from external vibrations.

EXAMPLES

The present invention will be described below in detail based on Examples and Comparative examples. However, it is needless to say that the present invention is not limited to Examples to be described below.

Specifications of battery packs in Examples 1 to 14 and Comparative examples 1 and 2 and test results thereof will be shown in Tables 1 and 2 below.

TABLE 1

|  | Unit cell | Coupling state | Press structure | Number of pressure structures | Remarks | Pressing force (kgf/cm²) | Cell's Young's modulus (kgf/cm²) | Pressing force/Cell's Young's modulus (%) |
|---|---|---|---|---|---|---|---|---|
| Example 1 | Unit cell 20 | Four-parallel | Coil spring (FIG. 3A) | 1 |  | 1 | 2.5 | 40 |
| Example 2 | Unit cell 20 | Four-parallel | Disk spring (FIG. 3B) | 1 |  | 1 | 3 | 33 |
| Example 3 | Unit cell 20 | Four-parallel | Laminated leaf spring (FIG. 3C) | 1 |  | 3 | 3 | 100 |
| Example 4 | Unit cell 20 | Four-parallel | Air spring (FIG. 4A) | 1 |  | 5 | 3 | 167 |
| Example 5 | Unit cell 20 | Four-parallel | Elastic spring (FIG. 4B) | 1 |  | 10 | 2.5 | 400 |
| Example 6 | Unit cell 20 | Four-parallel | Outer case spring (FIG. 5) | 1 |  | 15 | 2 | 750 |
| Example 7 | Unit cell 20 | Four-parallel | Coil spring (FIG. 6A) | 2 |  | 1, 3 | 3 | 33, 67 |
| Example 8 | Unit cell 20 | Four-parallel | Coil spring (FIG. 6A) | 4 |  | 1, 2, 3, 4 | 3 | 33, 67, 100, 133 |

TABLE 1-continued

|  | Unit cell | Coupling state | Press structure | Number of pressure structures | Remarks | Pressing force (kgf/cm$^2$) | Cell's Young's modulus (kgf/cm$^2$) | Pressing force/Cell's Young's modulus (%) |
|---|---|---|---|---|---|---|---|---|
| Example 9 | Unit cell 20 | Four-parallel | Coil spring (FIGS. 8A and 8B) | 1 | (*1) | 1 | 3 | 33 |
| Example 10 | Unit cell 20 | Four-parallel | Coil spring (FIGS. 9A and 9B) | 4 | (*1) | 1, 1, 1, 1 | 3 | 33, 33, 33, 33 |
| Example 11 | Unit cell 20 | Eight-parallel | Coil spring (FIG. 10A) | 1 |  | 2 | 3 | 33 |
| Example 12 | Unit cell 20 | Eight-parallel, two-series | Coil spring (FIG. 10B) | 1 |  | 4 | 3 | 33 |
| Example 13 | Unit cell 20 | Four-parallel, six-series | Coil spring (FIG. 1) | 4 | (*1) | 1, 1, 1, 1 | 3 | 33, 33, 33, 33 |
| Example 14 | Unit cell 25 | Four-parallel | Coil spring (FIG. 3A) | 1 |  | 1 | 3 | 33 |
| Comparative Example 1 | Unit cell 20 | Four-parallel | — | — | — | — | — | — |
| Comparative Example 2 | Unit cell 20 | Four-parallel | Coil spring (FIG. 3A) | 1 |  | 27.5 | 2.5 | 1100 |

(*1): Resonance peak position

TABLE 2

|  | Pressed area/ Electrode projection area of unit cell (%) | Tab width/Cell width (%) | Unit cell thickness (mm) | Primary resonance frequency difference (Hz) | Average reduction amount (dB) |
|---|---|---|---|---|---|
| Example 1 | 95 | 50 | 5 | 150 | 2 |
| Example 2 | 100 | 60 | 4 | 110 | 2 |
| Example 3 | 95 | 80 | 4 | 100 | 2 |
| Example 4 | 100 | 40 | 4 | 130 | 3 |
| Example 5 | 95 | 50 | 5 | 160 | 4 |
| Example 6 | 80 | 50 | 10 | 110 | 2 |
| Example 7 | 80 | 50 | 4 | 200 | 3 |
| Example 8 | 80 | 50 | 4 | 300 | 4 |
| Example 9 | 60 | 50 | 4 | 150 | 3 |
| Example 10 | 90 | 50 | 4 | 350 | 5 |
| Example 11 | 90 | 50 | 4 | 140 | 3 |
| Example 12 | 90 | 50 | 4 | 120 | 4 |
| Example 13 | 90 | 50 | 4 | 250 | 6 |
| Example 14 | 60 | 10 | 4 | 140 | 2 |
| Comparative Example 1 | — | 50 | 5 | 0 | 0 |
| Comparative Example 2 | 95 | 50 | 5 |  |  |

The specifications of the battery packs include the types of the unit cells, the coupling states of the unit cells, the types and numbers of the press structures, the installing positions of the press structures, the pressing forces per unit area (kgf/cm$^2$), the cell's Young's modulus of the entire unit cells (kgf/cm$^2$), the ratios of the pressing forces and the cell's Young's modulus (%), the ratios of the pressed areas and the electrode projection areas of the unit cells (%), the ratios of the widths of the tab terminals and the widths of the cell bodies (%), and the thicknesses of the unit cells mm.

As for the test, the hammering test and the measurement for average reduction ratios were performed. The contents of the respective tests are as follows.

1. Hammering Test

An acceleration pickup was attached onto an approximately center portion of the outer case of the battery pack. A part of the outer case was hammered by an impulse hammer, and a vibration spectrum of the acceleration pickup at this time was measured. A setting method for the test was conformed to JIS B0908 (Methods for the calibration of vibration and shock pick-ups—Basic concepts) (ISO 5347-0). The measured spectrum was analyzed by an FET analyzer and converted into the dimensions of the frequency and the acceleration, and thus resonance spectra were obtained. One that appeared on the lowest frequency side among the obtained resonance spectra was defined as a primary resonance frequency. A difference between the primary resonance frequency in the battery pack of each Example, in which a vibration isolation device including a press structure was provided, and a primary resonance frequency when the vibration isolation device was detached from the battery pack of each Example was defined as a "primary resonance frequency difference."

2. Measurement for Average Reduction Amount

From the vibration spectra of the acceleration pickup, which were obtained by the above hammering test, the accelerations were averaged in a frequency range from 10 Hz to 300 Hz. Then, reduction amounts were calculated by subtracting therefrom average accelerations in the case where no press structure was provided. Larger numerical values of the average reduction amounts mean that the vibrations are further attenuated by the vibration isolation device including the press structure.

Example 1

Four pieces of the laminated package unit cells 20 in the form shown in FIGS. 11A and 11B were used. The thickness of each unit cell 20 is 5 mm, and the width of the lab terminals 24a and 24b is 50% of that of the cell body 23. The unit cells 20 were connected to one another in four-parallel, and thus the battery pack 10 shown in FIG. 3A was manufactured. Specifically, four pieces of the unit cells 20 were connected in parallel to be installed as an assembled battery in the metal-made outer case 30. A metal plate as the press plate 51 was installed on the upper portions of the unit cells 20. The metal plate is an aluminum plate having a thickness of 1 mm. Then, the press structure 50 that pressed the metal plate with a surface pressure of 1 kgf/cm² was formed in such a manner that each of the four coil springs 53 pressed the approximately center portion of the unit cell 20.

For the battery pack of Example 1, the spectrum of free oscillation of the outer case 30 was measured by the hammering test. After setting the press structure 50, the peak of the primary resonance frequency was shifted to the higher frequency side by about 150 Hz. The peak was shifted to the higher frequency side similarly in each Example below. Moreover, the acceleration ratios were measured in the frequency range from 10 Hz to 300 Hz, and an average of reduction amounts thereof was measured. Then, the average reduction amount was 2 dB.

Example 2

The elastic members 52 of the press structure 50 were changed from the coil springs 53 to the disk springs 54, and the battery pack 10 shown in FIG. 3B was manufactured. As shown in Tables 1 and 2, Example 2 is different from Example 1 also in the cell's Young's modulus, the ratio of the pressing force and the cell's Young's modulus, the ratio of the pressed area and the electrode projection area of the unit cell, the ratio of the tab width and the cell width, and the unit cell thickness.

The primary resonance frequency difference of the battery pack 10 of Example 2 was about. 10 Hz, and the average reduction amount was 2 dB.

Example 3

The elastic members 52 of the press structure 50 were changed from the coil springs 53 to the laminated leaf springs 55, and the battery pack 10 shown in FIG. 3C was manufactured. As shown in Tables 1 and 2, Example 3 is different from Example 1 also in the pressing force, the cell's Young's modulus, the ratio of the pressing force and the cell's Young's modulus, the ratio of the tab width and the cell width, and the unit cell thickness.

The primary resonance frequency difference of the battery pack 10 of Example 3 was about 100 Hz, and the average reduction amount was 2 dB.

Example 4

The elastic members 52 of the press structure 50 were changed from the coil springs 53 to the air springs 56, and the battery pack 10 shown in FIG. 4A was manufactured. As shown in Tables 1 and 2, Example 4 is different from Example 1 also in the pressing force, the cell's Young's modulus, the ratio of the pressing force and the cell's Young's modulus, the ratio of the pressed area and the electrode projection area of the unit cell, the ratio of the tab width and the cell width, and the unit cell thickness.

The primary resonance frequency difference of the battery pack 10 of Example 4 was about 130 Hz, and the average reduction amount was 3 dB.

Example 5

The elastic members 52 of the press structure 50 were changed from the coil Springs 53 to the elastic spring 57, and the battery pack 10 shown in FIG. 4B was manufactured. As shown in Tables 1 and 2, Example 5 is different from Example 1 also in the pressing force, and the ratio of the pressing force and the cell's Young's modulus.

The primary resonance frequency difference of the battery pack 10 of Example 5 was about 160 Hz, and the average reduction amount was 4 dB.

Example 6

The press structure 60 were constituted by the plane elastic body 61 which forms the one surface 31 of the outer case 30, and the battery pack 10 shown in FIG. 5 was manufactured. As shown in Tables 1 and 2, Example 6 is different from Example 1 also in the pressing force, the cell's Young's modulus, the ratio of the pressing force and the cell's Young's modulus, the ratio of the pressed area and the electrode projection area of the unit cell, and the unit cell thickness.

The primary resonance frequency difference of the battery pack 10 of Example 6 was about 110 Hz, and the average reduction amount was 2 dB.

Example 7

Similarly to Examples 1 to 6, four pieces of the laminated package unit cells 20 in the form shown in FIGS. 11A and 11B were used. The thickness of each unit cell 20 is 4 mm, and the width of the tab terminals 24a and 24b is 50% of that of the cell body 23. The unit cells 20 were connected to one another in four-parallel, and thus the battery pack 10 shown in FIG. 6A was manufactured. Specifically, four pieces of the unit cells 20 were connected in parallel to be installed as an assembled battery in the metal-made outer case 30. The four unit cells were divided in two groups, each having two unit cells, and the left-side metal plate 51a was installed on the upper portion of the two unit cells 20 belonging to the group on the left-side in the drawing. The left-side metal plate 51a is an aluminum plate having a thickness of 1 mm. Then, the press structure 50a that pressed the left-side metal plate 51a with a surface pressure of 1 kgf/cm² was formed in such a manner that one coil spring 53a pressed a position between the two unit cells 20. Meanwhile, the right-side metal plate 51b was installed on the upper portion of the two unit cells 20 belonging to the group on the right-side in the drawing. The right-side metal plate 51b is an aluminum plate having a thickness of 3 mm. Then, the press structure 50b that pressed the right-side metal plate 51b with a surface pressure of 3 kgf/cm² was formed in such a manner that one coil spring 53b pressed a position between the two unit cells 20.

The primary resonance frequency difference of the battery pack 10 of Example 7 was about 200 Hz, and the average reduction amount was 3 dB.

Example 8

The unit cells 20 similar to those in Example 7 were connected to one another in four-parallel, and the battery pack 10 shown in FIG. 6B was manufactured. Specifically, four pieces of the unit cells 20 were connected in parallel to be installed as an assembled battery in the metal-made outer case 30. As shown in FIG. 6B, the four unit cells 20 were pressed by the independent press structures 50a to 50d, respectively. In the press structures 50a to 50d, the thicknesses of the metal plates 51a to 51d made of aluminum plates and the surface pressures for pressing the metal plates 51a to 51d were set from the left side as: 1 mm in thickness and 1 kgf/cm² in surface pressure; 2 mm in thickness and 2 kgf/cm² in surface pressure; 3 mm in thickness and 3 kgf/cm² in surface pressure; and 4 mm in thickness and 4 kgf/cm² in surface pressure.

The primary resonance frequency difference of the battery pack 10 of Example 8 was about 300 Hz, and the average reduction amount was 4 dB.

Example 9

The coil springs 53 of the press structure 50 were installed at the resonance peak positions A on the outer plate 31 of the outer case 30, and the battery pack 10 shown in FIGS. 8A and 8B was manufactured. Example 9 is different from Example 1 also in the cell's Young's modulus, the ratio of the pressing force and the cell's Young's modulus, the ratio of the pressed area and the electrode projection area of the unit cell, and the unit cell thickness.

The primary resonance frequency difference of the battery pack 10 of Example 9 was about 150 Hz, and the average reduction amount was 3 dB.

Example 10

The coil springs 53 of the press structure 50 were installed at the resonance peak positions A on the outer plate 31 of the outer case 30, and the battery pack 10 shown in FIGS. 9A and 9B was manufactured. Example 10 is different from Example 8 also in the pressing force, the ratio of the pressing force and the cell's Young's modulus, and the ratio of the pressed area and the electrode projection area of the unit cell.

The primary resonance frequency difference of the battery pack 10 of Example 10 was about 350 Hz, and the average reduction amount was 5 dB.

Example 11

Eight pieces of the unit cells 20 stacked in two steps in the thickness direction are connected in parallel (eight-parallel), and the battery pack 10 shown in FIG. 10A was manufactured. Example 11 is different from Example 1 also in the pressing force, the cell's Young's modulus, the ratio of the pressing force and the cell's Young's modulus, the ratio of the pressed area and the electrode projection area of the unit cell, and the unit cell thickness.

The primary resonance frequency difference of the battery pack 10 of Example 11 was about 140 Hz, and the average reduction amount was 3 dB.

Example 12

Two units, each having four pieces of the unit cells 20 stacked in the thickness direction, that is, eight pieces in total of the unit cells were connected in parallel, and two units, each having the eight unit cells connected in parallel, were coupled in series (eight-parallel, two-series). Thus, the battery pack 10 similar in form to the battery pack shown in FIG. 10B was manufactured. The pressing force here is different from that of Example 11.

The primary resonance frequency difference of the battery pack of Example 12 was about 120 Hz, and the average reduction amount was 4 dB.

Example 13

Four pieces of the unit cells 20 stacked in the thickness direction were connected in parallel, and this unit having the four unit cells connected in parallel, were coupled in series (four-parallel, six-series). Thus, a battery pack shown in FIG. 1 was manufactured. The coil springs 53 were installed at the resonance peak positions A on the outer plate 31 of the outer case 30. Example 13 is different from Example 8 also in the pressing force, the ratio of the pressing force and the cell's Young's modulus, and the ratio of the pressed area and the electrode projection area of the unit cell.

The primary resonance frequency difference of the battery pack of Example 13 was about 250 Hz, and the average reduction amount was 6 dB.

Example 14

Four pieces of the laminated package unit cells 20 in the form shown in FIGS. 11C and 11D were used. The thickness of each unit cell 25 is 4 mm, and the width of the lab terminals 27a and 27b is 10% of that of the cell body 26. Example 14 is different from Example 1 also in the cell's Young's modulus, the ratio of the pressing force and the cell's Young's modulus, and the ratio of the pressed area and the electrode projection area of the unit cell.

The primary resonance frequency difference of the battery pack of Example 14 was about 140 Hz, and the average reduction amount was 2 dB.

Comparative Example 1

A battery pack similar to that of Example 1 except that the press structure 50 or 60 was not installed was manufactured.

Comparative Example 2

A battery pack similar to that of Example 1 except that the pressing force was set eleven times the Young's modulus of the entire unit cells was manufactured.

Because the pressing force was strong, the occurrence probability of an internal short circuit in the unit cells was somewhat increased.

Evaluation

According to the battery packs of Examples 1 to 14, the average reduction amounts ranged from 2 dB to 6 dB, and it was understood that the vibration isolation effect by the vibration isolation device was obtained. Moreover, no performance deterioration of the unit cells was observed.

The entire content of a Japanese Patent Application No. P2002-51854 with a filing date of Feb. 27, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A battery pack, comprising:
   a unit cell packaged by a package material of a laminate type;
   an outer case which accommodates the unit cell therein; and
   a vibration isolation device which attenuates vibrations inputted to the outer case and transmitted to the unit cell by pressing one side surface of the unit cell.

2. The battery pack of claim 1,
   wherein a plurality of the unit cells are accommodated in the outer case, and constitute an assembled battery.

3. The battery pack of claim 1,
   wherein just the one unit cell is accommodated in the outer case.

4. The battery pack of claim 1,
   wherein the vibration isolation device is disposed between the unit cell and the outer case, and includes a first press structure which presses the one side surface of the unit cell.

5. The battery pack of claim 4,
   wherein the first press structure is constituted by connecting one surface of the outer case, the one surface facing to the one side surface of the unit cell, and a press plate abutting against the one side surface of the unit cell with an elastic member interposed therebetween.

6. The battery pack of claim 5,
wherein the elastic member is any of a coil-shaped spring, a dish-shaped spring, a plate-shaped spring, an air spring and an elastic spring.

7. The battery pack of claim 1,
wherein the vibration isolation device includes a second press structure which presses the one side surface of the unit cell by means of surface rigidity of a plate material forming one surface of the outer case.

8. The battery pack of claim 7,
wherein the second press structure is constituted by connecting an elastic plate material and a press plate with a support member interposed therebetween, in which the elastic plate material forms the one surface of the outer case, the one surface facing to the one side surface of the unit cell, and the press plate abuts against the one side surface of the unit cell.

9. The battery pack of claim 1,
wherein a plurality of the vibration isolation devices are provided.

10. The battery pack of claim 1,
wherein the vibration isolation device is provided on a resonance peak position on one surface of the outer case, the one surface facing to the one side surface of the unit cell.

11. The battery pack of claim 1,
wherein pressing force per unit area which presses the one side surface of the unit cell by the vibration isolation device is ten times or lower than a Young's modulus of the unit cell.

12. The battery pack of claim 1,
wherein a pressed area of the one side surface of the unit cell, the pressed area being pressed by the vibration isolation device, is in a range from 50% to 100% of an area onto which an electrode surface of the unit cell is projected.

13. The battery pack of claim 1,
wherein the unit cell is a cell including tab terminals on both end portions of a cell body.

14. The battery pack of claim 1,
wherein the unit cell is a thin cell having a thickness in a range from 1 mm to 10 mm in an electrode stacking direction.

15. The battery pack of claim 1,
wherein, a width of a tab terminal provided on a cell body of the unit cell ranges from 20% to 80% of a width of the cell body.

16. A combined battery pack, comprising:
a battery pack comprising a unit cell packaged by a package material of a laminate type; an outer case which accommodates the unit cell therein; and a vibration isolation device which attenuates vibrations inputted to the outer case and transmitted to the unit cell by pressing one side surface of the unit cell,
wherein the combined battery pack is formed by connecting a plurality of the battery packs to one another and electrically connecting the unit cells in the battery packs to one another.

17. A vehicle-mounted battery pack, comprising:
a battery pack comprising a unit cell packaged by a package material of a laminate type; an outer case which accommodates the unit cell therein; and a vibration isolation device which attenuates vibrations inputted to the outer case and transmitted to the unit cell by pressing one side surface of the unit cell.

18. A battery pack, comprising:
a unit cell packaged by a package material of a laminate type;
an outer case which accommodates the unit cell therein; and
a vibration isolating means for attenuating vibrations inputted to the outer case and transmitted to the unit cell by pressing one side surface of the unit cell.

* * * * *